United States Patent [19]

Sekiguchi

[11] Patent Number: 4,752,116

[45] Date of Patent: Jun. 21, 1988

[54] TRANSMISSION TYPE PROJECTION SCREEN

[75] Inventor: Hiroshi Sekiguchi, Tokyo, Japan

[73] Assignee: Dai Nippon Insatsu Kabushiki Kaisha, Shinjuku, Japan

[21] Appl. No.: 74,253

[22] Filed: Jul. 16, 1987

[30] Foreign Application Priority Data

Jul. 25, 1986 [JP] Japan ................................. 61-175341

[51] Int. Cl.$^4$ ............................................. G03B 21/60
[52] U.S. Cl. ..................................................... 350/128
[58] Field of Search ................................... 350/127–129

[56] References Cited

U.S. PATENT DOCUMENTS

| 4,147,408 | 4/1979 | Plummer | 350/128 |
| 4,374,609 | 2/1983 | Lange | 350/128 |
| 4,387,959 | 6/1983 | Lange et al. | 350/128 |
| 4,536,056 | 8/1985 | Oguino | 350/128 |
| 4,636,035 | 1/1987 | Clausen et al. | 350/128 |

Primary Examiner—Richard A. Wintercorn
Attorney, Agent, or Firm—Parkhurst & Oliff

[57] ABSTRACT

A screen formed with a plurality of lenticular lenses on both the surfaces is provided. There are formed on the incident surface a plurality of sets of incident side main lenticular lenses and incident side auxiliary lenticular lenses, each set being arranged on both the sides of the main lenticular lens. Further, there are formed on the emission surface a plurality of emission side main lenticular lenses and a plurality of pairs of emission side auxiliary lenticular lenses, each pair being arranged on both the sides of the main lenticular lens. The greater part of an incident light is incident from the incident side main lenticular lens and is emitted from the emission side main lenticular lens at a predetermined diffusion angle. The remaining incident light is incident from the incident side auxiliary lenticular lenses and is emitted from the emission side auxiliary lenticular lenses at a different angle.

5 Claims, 6 Drawing Sheets

TRANSMISSION TYPE PROJECTION SCREEN

BACKGROUND OF THE INVENTION

The present invention relates to a projection screen, and more particularly to an improvement in a transmission type projection screen.

Transmission type projection screens, in which an image is projected from the rear side and the projected image is observed from the front side, have been known in the art. Transmission type projection screens of various configurations have been already proposed. Particularly, for the transmission type screens having been recently used for the color television projectors, it is required to have not only a function essential to the screen to diffuse a light toward the side of an observer, but also a function to correct "color shift" produced resulting from the fact that light rays indicating colors of red (R), green (G) and blue (B) are projected from different positions. In addition, reduction of the external reflection is required for the screen which is used for the color television projectors, because the luminance of the color television projectors is not so high that, in a well-lighted room, the indoor or outdoor light is reflected on the screen surface so as to lower the contrast of the projected image, thus to damage visual recognizability.

For the article to satisfy the above-requirement, there is known a lenticular sheet with black stripes comprising a large number of lenticules arranged in a vertical direction on both the surfaces of the sheet, and light absorption layers provided at portions from which light is not emitted of light emission surfaces which will be simply referred to as "emission surfaces" hereinafter.

However, the drawback with the above-mentioned lenticular sheet is that an angle of view of visual field in a horizontal direction is limited to a range of 30 degrees in each of clockwise and counterclockwise directions with the optical axis being as the center, i.e., a narrow range of 60 degrees in total. On the other hand, in order to widen the horizontal viewing angle, there is also known a transmission type screen having a portion where a part of the incident light is totally reflected. However, since an element for correcting color shift is not included in the screen of this type, color shift becomes large. In addition, it is required for reducing the reflection of an external light to provide light absorption layers on the surface from which light is not emitted of the emission surface. Since, in the case of this type of screen, the surface from which light is not emitted is the one on which a part of incident light is totally reflected, it is necessary to provide light absorption layers on the total reflection surface. To realize this, it is required to first provide reflection layers on a surface which is to serve as a total reflection surface and to second provide light absorption layers thereon. In addition, since the surface from which light is not emitted generally exists on a concave portion, it is very difficult to provide respective layers on such a concave portion.

SUMMARY OF THE INVENTION

The present invention has been made for solving the above-mentioned problems and its object is to provide a transmission type projection screen having a broader angle of view in a horizontal direction.

Another object of the present invention is to provide a transmission type projection screen having less "color shift" produced resulting from the fact that light rays indicating three primary colors of R, G and B are reflected from different positions, respectively, in the case of projecting a color pictorial image using a color television projector.

A further object of the present invention is to provide a transmission type projection screen having a structure easy to provide light absorption layers in order to reduce the reflection of an external light, thus making it possible to provide an image of high contrast.

To achieve the above-mentioned objects, the present invention provides a transmission type projection screen in which a plurality of lenticular lenses are formed on both the surfaces of the incident and emission surfaces, characterized in that:

there are formed on the incident surface a plurality of incident side main lenticular lenses for allowing the greater part of an incident light to be incident, and a plurality of pairs of incident side auxiliary lenticular lenses for allowing the remaining part of the incident light to be incident, the incident side auxiliary lenticular lenses constituting each pair being arranged on both the sides of the incident side main lenticular lens, respectively;

there are formed on the emission surface a plurality of emission side main lenticular lenses for allowing a light which is incident to the incident side main lenticular lens to be emitted to the outside, and a plurality of pairs of emission side auxiliary lenticular lenses for allowing a light which is incident to the incident side auxiliary lenticular lens to be emitted to the outside, the emission auxiliary lenticular lenses constituting each pair being arranged on both the sides of the emission side main lenticular lens, respectively;

and the incident side main lenticular lenses and the emission side main lenticular lenses, and the incident side auxiliary lenticular lenses and the emission side auxiliary lenticular lenses are arranged in the same direction at positions such that the incident side main lenticular lenses and the emission side main lenticular lenses have one to one correspondence relationship and the incident side auxiliary lenticular lenses and the emission side auxiliary lenticular lenses have one to one correspondence relationship, respectively.

DESCRIPTION OF THE PEFERRED EMBODIMENTS

Figure 1:
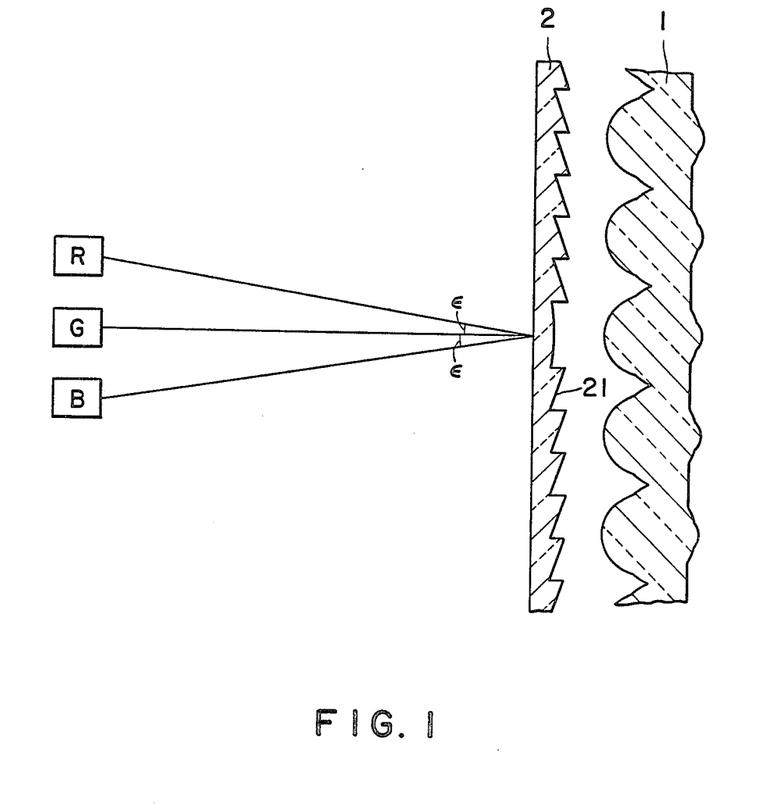
FIG. 1 is a horizontal cross section showing that projection is conducted from a color television projector to a projection screen according to the present invention.

FIG. 1 is a schematic view showing an example of use of a transmission type projection screen of the invention. As seen from this figure, in the vicinity of a transmission type projection screen 1 of the invention, a Fresnel convex lens sheet 2 for converging an incident light to a suitable angular range is arranged. The horizontal cross sections of both the projection screen 1 and the lens sheet 2 are illustrated in this figure, respectively. As in the example shown, it is ordinary that the projection screen 1 is combined with the Fresnel convex lens sheet 2, but the Fresnel convex lens sheet 2 may be omitted. Blocks labeled R, G and B represent three projection CRTs for projecting color information indicative of Red (R), green (G) and blue (B) of the color television projector, respectively. Lines drawn from the CRTs to the center of the lens represent rays of incident light, respectively. When a light vertically incident from the CRT for projecting the information indicative of green is assumed as reference, incident angles of incident rays of light indicative of red and blue deviate from the incident angle of the incident ray of light indicative of green by an angle indicated by $\epsilon$. This angular deviation of the incident light is the cause that deviation of distribution based on color of a light emitted, i.e., color shift is produced. The angle $\epsilon$ is, e.g., approximately 10 degrees.

Figure 2:
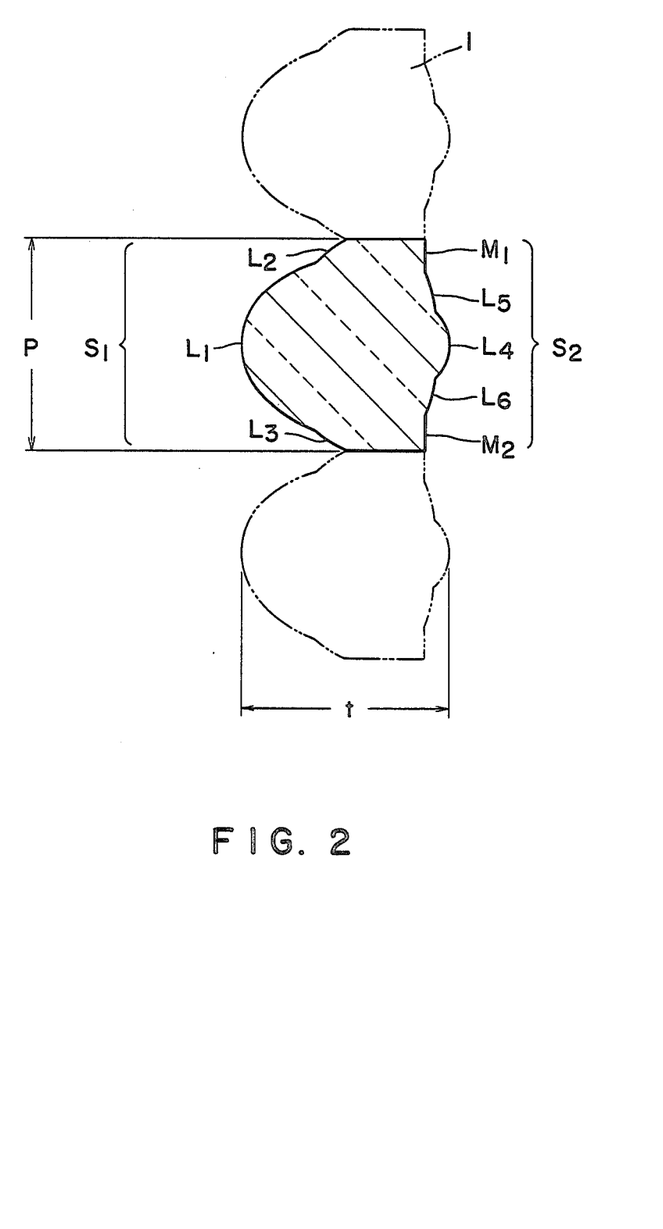
FIG. 2 is a horizontal cross section partially showing an embodiment of a projection screen according to the present invention.

FIG. 2 shows an enlarged cross section of the screen 1 wherein a portion encompassed by the solid line is a unit portion. A large number of unit portions are arranged in upper and lower directions as indicated by double-dotted lines in this figure, thereby forming a screen.

The left surface of the screen 1 forms an incident surface $S_1$ and the right surface thereof forms an emission surface $S_2$. The incident surface $S_1$ is formed of two kinds of lenses. Namely, the incident surface $S_1$ comprises an incident side main lenticular lens $L_1$ occupying the greater part of the incident surface, and incident side auxiliary lenticular lenses $L_2$ and $L_3$ occupying the remaining portions of the incident surface. The lenses $L_2$ and $L_3$ are so arranged on both the sides of the lens $L_1$ that they are in contact with each other.

The dimensions of the main lenticular lens $L_1$ and the auxiliary lenticular Lenses $L_2$ and $L_3$, hold a relationship such that the ratio of sum of the width of the lens $L_2$ (which is defined as one measured in a direction of the pitch P and the same definition will be applied hereinafter) and the width of the lens $L_3$ to the width of the lens $L_1$ is equal to 1/9 to 4/6. Accordingly, the lens $L_1$ has 90 down to 60% of the incident light in its charge, thus allowing it to be incident, and the lenses $L_2$ and $L_3$ have the remaining 10 to 40% of the incident light in their charges, thus allowing it to be incident.

The emission surface $S_2$ is also formed of two kinds of lens portions. Namely, the emission surface $S_2$ comprises an emission side main lenticular lens $L_4$ in the center thereof and auxiliary lenticular lenses $L_5$ and $L_6$ arranged on the both sides of the main lenticular lens $L_4$, respectively. $M_1$ and $M_2$ denote portions from which light is not emitted. In this embodiment, these portions are formed planar.

The dimensional relationship between the main lenticular lens $L_4$ and the auxiliary lenticular lenses $L_5$ and $L_6$ corresponds to the dimensional relationship between the incident side main lenticular lens $L_1$ and the auxiliary lenticular lenses $L_2$ and $L_3$. Since a light refracted by the lens $L_1$ is focused on the lens surface of the lens $L_4$, even if the width of the lens $L_4$ is smaller than that of the lens $L_1$, there is no inconvenience.

When a screen for a television of 40 inches or more is assumed, the pitch P is 0.3 to 1.5 mm and the thickness t is 0.3 to 1.5 mm in the screen thus configured, although they change in dependence upon a dimension of the entirety of the screen or a distance between the screen and an observer.

Figure 3:
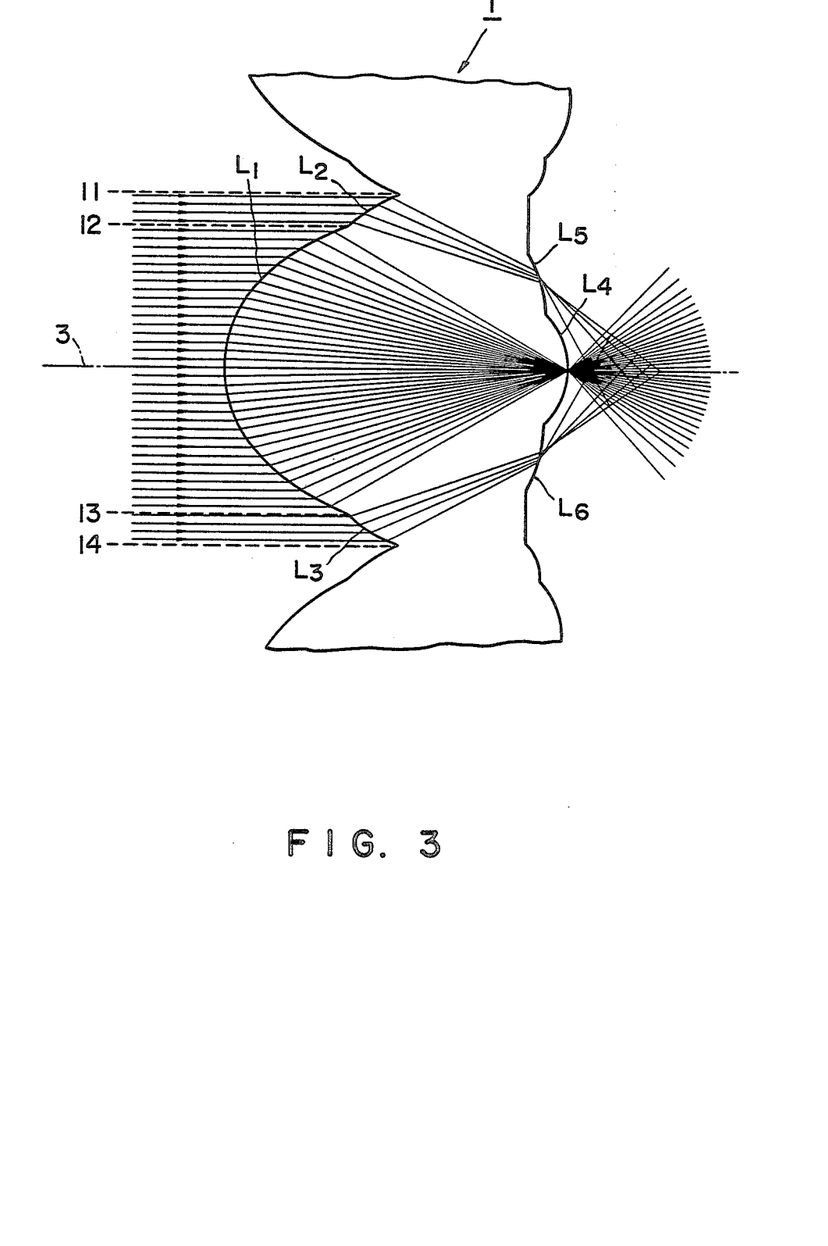
FIG. 3 is a diagrammatical view showing optical paths in a partially enlarged portion of the screen shown in FIG. 2.

FIG. 3 is a schematic diagram showing the effects of respective portions constituting the screen 1, particularly the effects of the lenses $L_1$ and $L_4$ and the lenses $L_2$, $L_3$, $L_5$ and $L_6$ wherein the screen 1 itself is formed in the same manner as that in FIG. 2.

In FIG. 3, solid lines with an arrow denote rays of light incident to the screen. In this instance, all rays of light are incident in parallel to the optical axis 3 of the lens $L_1$. Rays of light between broken lines 11 and 12 are incident to the lens $L_2$, rays of light between broken lines 12 and 13 are incident to the lens $L_1$, and rays of light between broken lines 13 and 14 are incident to the lens $L_3$.

Initially, rays of light between broken lines 12 and 13 are refracted by the lenses $L_1$ and $L_4$ and then are emitted to the outside. The emission range can be changed by the shapes of the lenses $L_1$ and $L_4$. These lenses $L_1$ and $L_4$ may be formed as a portion of circle, ellipse or parabola, or other curves. In the case shown in this figure, the lens $L_1$ is formed as a portion of ellipse in which the ratio of the long diameter to the short diameter is equal to 1/0.733 and the lens $L_4$ is formed as a portion of ellipse in which the ratio of the long diameter to the short diameter is equal to 1/0.655. Light is emitted in a range of ±49 degrees with respect to the normal vertical to the screen. Although light is emitted in a range of ±49 degrees, since quantity of light emitted is reduced according as an angle increases, the observable range of the light emitted is equal to approximately 30 degrees in practical use.

In addition, rays of light incident to the ranges between broken lines 11 and 12 and between broken lines 13 and 14 are respectively refracted by the lenses $L_2$ and $L_5$ and the lenses $L_3$ and $L_6$ and then are emitted to the outside. Also in this instance, as the diffusion range of the light emission varies in dependence upon the shapes of the lenses $L_2$ and $L_3$ and the lenses $L_5$ and $L_6$, basically rays of light respectively incident to the lenses $L_2$ and $L_3$ are refracted in a manner that they reach the optical axis 3 to arrive at the lenses $L_5$ and $L_6$, thereafter to be further refracted by the lenses $L_5$ and $L_6$ so that they reach the optical axis 3. The lenses $L_2$, $L_3$, $L_5$ and $L_6$ performing such an effect are formed as a portion of circle, ellipse or parabola, or other curves. In the case shown in this figure, the lenses $L_2$ and $L_3$ are formed as a portion of ellipse in which the ratio of the long diameter to the short diameter is equal to 1/0.512 and the lenses $L_5$ and $L_6$ are formed as a portion of circle wherein light is emitted in a range of +32 to +63 degrees and in a range of −32 to −63 degrees.

Thus, the screen of the invention can widen an angle of view as compared to the conventional screen in which the incident and emission to the conventional screen in which the incident and emission surfaces are formed with one kind of lenticular lens groups, respectively.

The horizontal diffusion characteristic of a light emitted in the present invention can be varied not only by the shape of each lens but also by the ratio of rays of light incident to the incident side main and auxiliary lenticular lenses, i.e., the ratio of the dimension of the main lenticular lens to that of the auxiliary lenticular lens. Accordingly, the present invention permits a diffusion range of the light emission nearly equal to zero degrees to be bright, a range of approximately 30 to 50 degrees to be bright or a range of approximately 0 to 50 degrees, which is ordinarilly regarded as the most desirable range, to be kept at a uniform brightness, or whatever desired. In the embodiment shown in FIG. 3, the ratio of rays of light incident to the incident side main and auxiliary lenticular lenses is equal to 1/0.23. Since the respective diffusion ranges of the light emission are as above, light is generally emitted uniformly up to a range nearly equal to 0 to 45 degrees.

In connection with the screen having lenticular lenses on both the sides thereof, it has been known that it is possible to lessen color shift by adequately designing lenticular lenses on the incident and emission sides. To speak theoretically, if the surface form which light is emitted is formed as a portion of circle or ellipse or the like, the degree of refraction toward the lens axis increases in proportion to the distance from the center of the lens. Accordingly, when rays of light having different incident angles are incident to the screen, the difference between the emission angles becomes small as compared to the difference between incident angles.

Also in the present invention, by adequately designing the incident and emission side main lenticular lenses, it is possible to lessen, in the same manner, color shift of a light emitted from the main lenticular lens. In addition, because of the principle as stated above, it is possible to reduce the color shift of a light emitted from the auxiliary lenticular lens by the same way. Accordingly, the screen of the invention can reduce the color shift of the entirety of rays of light emitted.

Figure 4:
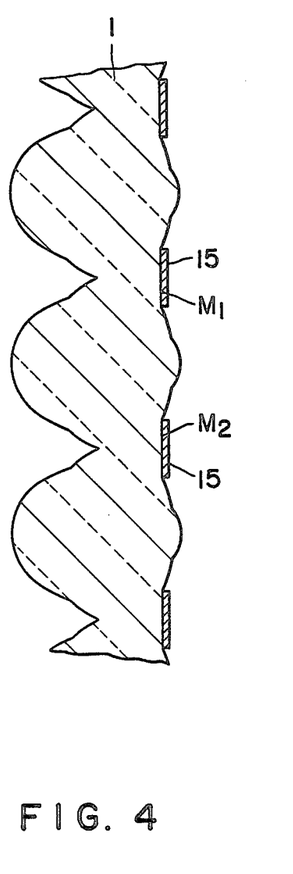
FIG. 4 is a horizontal cross sectional view partially showing that an absorption layers are provided on non-light emission portions of the screen shown in FIG. 2.

A modified embodiment of a screen according to the present invention is shown in FIG. 4. This embodiment is characterized by the providing of light absorption layers 15 at non-light emission portions of the screen employed in the above-mentioned embodiment, thereby to make it possible to reduce reflection of unnecessary exterior light, thus permitting realization of a high contrast screen in which lowering of contrast is small even in a bright or well-lighted room.

Figure 5:
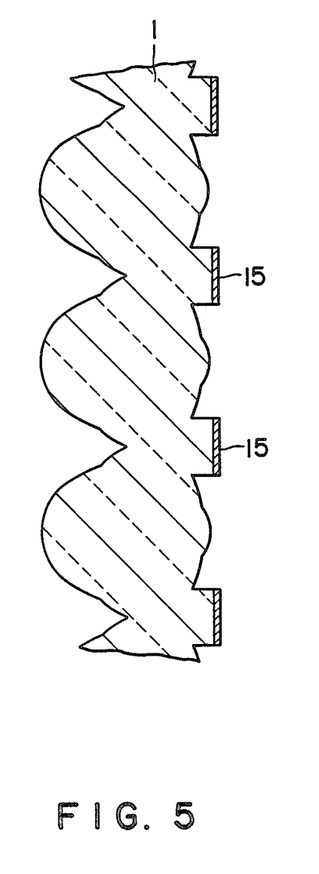
FIG. 5 is a horizontal cross section partially showing a screen specially formed for providing absorption layers as a modified embodiment of the invention.

Such a light absorption layer may be provided by using the known printing, painting or transfer method, etc. For the light absorption layer itself, a composite material having light absorption property, e.g., a material in which a pigment of black, etc. and preferably a flatting agent are filled into a known paint or ink may be used. It is preferable that particularly portions at which the light absorption layer 15 is provided are formed as projections having a flat surface when forming the lens plate as shown in FIG. 5 because the formation of the light absorption layer is further facilitated, when any one of printing, painting or transfer method is employed.

As just described above, the screen of the invention makes it possible to widen an angle of view, to desirably design the horizontal diffusion characteristic, to reduce color shift, and to easily realize high contrast.

The screen of the invention may be caused to have optical diffusion property to diffuse a light emitted in a vertical direction (in upper and lower directions when viewed from an observer). For a method for allowing the screen to have the optical diffusion property, there is known, e.g., a method to fill an optical diffusion material into the material constituting the screen. Namely, there may be used a material obtained by filling fine particles exhibiting the optical scattering property into the material in the form of a paste. For the particle for scattering a light, there are shown, e.g., filler or extender such as fine powdered silica or powdered alumina, glass powder, and resin powder, etc. It is preferable that the particle diameter is approximately 0.5 to 30 $\mu$m. Further, it is preferable to fill the fine particles so that the ratio of the fine particle to the material constituting the screen is 0.5 to 5 weight %. It is to be noted that optical refractive index of the fine particle is required to be different from that of the material constituting the screen in order to scatter a light.

For another method for allowing the screen to have optical diffusion property, there is known a method in which the light emission surface is formed as an optical diffusion surface. For example, there are shown a method to stick a plastic film obtained by filling optical diffusion material by means of the technique, e.g., heat-fusing etc. at the time of formation of the screen, and a method to allow the emission surface to be formed as a coarse or rough surface by means of sandblast, etc.

For the material constituting the screen, any material may be used as long as the material is transparent and can be formed in the shape of sheet. It is preferable that thermoplastic resin, e.g., acrylic resin such as polymethyl methacrylate, polyester resin, cellulose system resin, polyvinyl chloride resin, polystyrene resin, or polycarbonate resin, etc., or glass is used. When the thermoplastic resin is used, the fabrication can be easily conducted with high efficiency. A method to apply heat and pressure to the sheet of the thermoplastic resin using a metal mold of an inversed type having a predetermined shape (plate- or roll-shaped), a method to implement the first-mentioned method to the sheet of the thermoplastic sheet which has not yet cooled immediately after the sheet is fabricated, or a casting or other forming method using a metal mold is suitable in the case of constituting the screen with the sheet of thermoplastic resin. In dependence upon the dimensions of the metal mold and the screen, a method to carry out manufacturing after cutting work is implemented per each thermoplastic resin sheet or a method to continuously carry out manufacturing a continuous roll- or coil-shaped sheet may be selectively conducted.

The screen of the invention itself functions as a transmission type projection screen. In addition, when the Fresnel convex lens sheet 2 is disposed on the incident side as shown in FIG. 1, it is possible to irradiate a projected light uniformly in every nook and corner of the screen, thus enabling the screen to be more effectively used. On the right surface in FIG. 1 of the Fresnel lens sheet 2, inclined surfaces 21 are concentrically formed. By the inclined surfaces 21, an incident light is subjected to refraction so that it reaches the entire surface of the screen 1.

Figure 6:
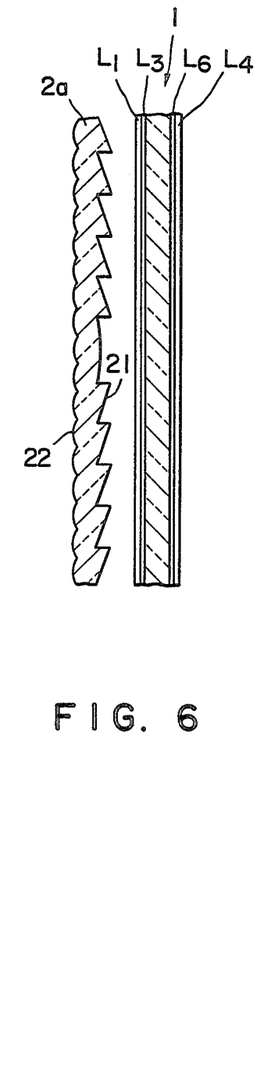
FIG. 6 is a vertical cross section showing one manner of use of a projection screen according to the present invention combined with a Fresnel lens.
Figure 7:
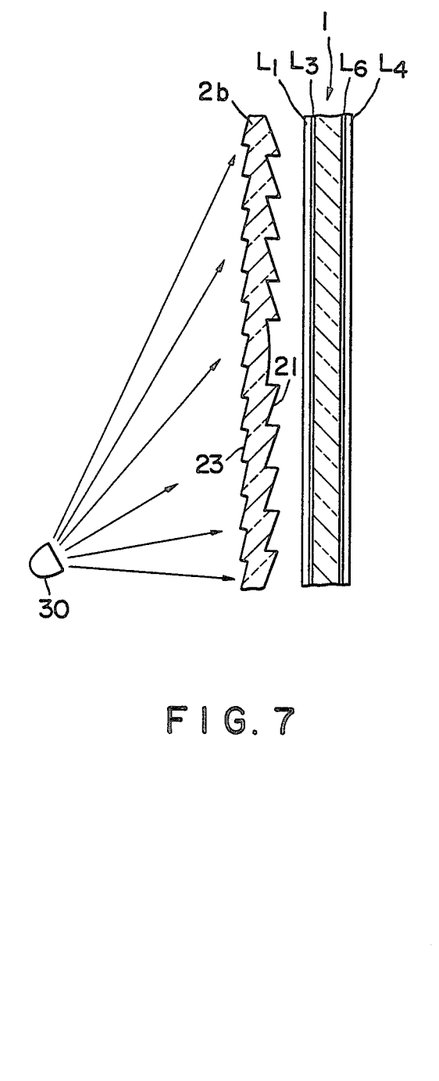
FIG. 7 is a vertical cross section showing another manner of use of a projection screen according to the present invention combined with another Fresnel lens.

FIGS. 6 and 7 are vertical cross sections showing another manner how the screen of the invention is used. Since these figures are drawn as the vertical cross sectional views, the lenticular lenses $L_1$ to $L_6$ formed on both the sides of the screen 1 extend in upper and lower directions in these figures. FIG. 6 shows an example in which a Fresnel convex lens sheet 2a is disposed on the side of the incident surface of the screen 1. The Fresnel convex lens sheet 2a is provided with inclined surfaces 21 on the right surface in this figure, and lenticular lenses on the left surface in this figure.

The longitudinal direction of each of the lenticular lenses $L_1$ to $L_6$ formed on the both sides of the screen 1 is in correspondence with vertical directions, whereas the lenticular lens 22 is disposed so that the longitudinal direction is in correspondence with the horizontal direction, thus functioning to widen an angle of view in a vertical direction of an image formed on the screen.

FIG. 7 shows an example in which a Fresnel convex lens sheet 2b is disposed on the incident side of the screen 1. The Fresnel convex lens sheet 2b is provided with inclined surfaces 21 on the right surface in this figure and inclined surfaces 23 on the left surface in this figure. The inclined surfaces 21 are concentric surfaces and the inclined surfaces 23 are elongated rectangular surfaces such that the horizontal direction is in correspondence with the longitudinal direction. When such a Fresnel convex lens sheet 2b is disposed, it is possible to uniformly form a projected image on the entire surface of the screen 1 in the case that a projector 30 is disposed below as shown. Since the projector 30 is ordinarily installed on a floor etc., such a configuration is very practical.

The screen of the invention is configured above, thus providing peculiar effects and advantages stated below.

(1) In the screen of the present invention, the greater part of the incident light is diffused by the main lenticular lenses formed on the incident and emission sides of the screen, and a portion of the remaining part thereof is incident to the incident side auxiliary lenticular lenses being arranged both the sides of the incident side main lenticular lens and then is refracted by the emission side auxiliary lenticular lenses being arranged both the sides of the emission side main lenticular lens, so that it is diffused in a range outside the diffusion range of the main lenticular lens. Accordingly, the screen of the invention can diffuse an incident light in a range broader than of the conventional screen provided with a single kind of lenticular lenses on the both sides thereof.

Figure 8:
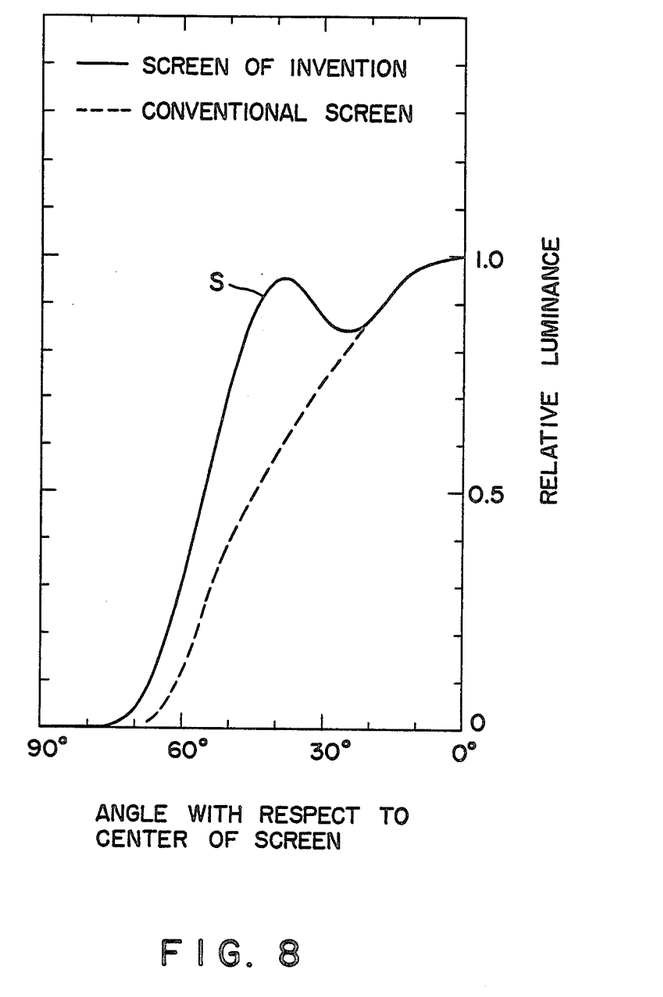
FIG. 8 is a graph showing the comparison between an angle of view of a projection screen according to the present invention and an angle of view according to a conventional screen.

The comparison between an angle of view in the screen of the present invention and that of the conventional screen is shown in FIG. 8. The solid line in this figure is a graph showing the relative luminance in the screen provided with two kinds of main and auxiliary lenticular lenses shown in FIG. 3 as a function of an angle with respect to the center of the screen, and broken lines in this figure is a graph showing the relative luminance in the conventional screen, which is similar to the graph indicated by the solid line. In the graph indicated by the solid line, a shoulder S appears by the effect of the auxiliary lenticular lens. Thus, it is demonstrated that the angle of view is widened.

(2) Since the ratio of rays of light incident to the main and auxiliary lenticular lenses on the side of incident and emission sides can be adjusted by the ratio of dimensions of both the lenses, a setting of the horizontal diffusion characteristic such that a specified portion of an angle of view is caused to be brightened can be desirably made.

(3) By suitably determining the shapes of the four lenses comprising two sets of main and auxiliary lenticular lenses on the incident and emission sides, it is possible to diffuse rays of light incident at different incident angles toward substantially the same direction. Accordingly, the screen of the invention can reduce color shift as compared to the screen provided with a single kind of lenticular lenses on both the sides thereof.

(4) The screen provided with the light absorption layers which is implemented as one manner of the present invention can provide a high contrast screen in which lowering of the contrast is small even in a well-lighted room.

What is claimed is:

1. In a transmission type projection screen in which a plurality of lenticular lenses are formed on both the surfaces of the incident and emission surfaces, the improvement wherein:

there are formed on the incident surface a plurality of incident side main lenticular lenses for allowing the greater part of an incident light to be incident, and a plurality of pairs of incident side auxiliary lenticular lenses for allowing the remaining part of the incident light to be incident, the incident side auxiliary lenticular lenses constituting each pair being arranged on both the sides of said incident side main lenticular lens, respectively;

there are formed on the emission surface a plurality of emission side main lenticular lenses for allowing a light which is incident to said incident side main lenticular lens to be emitted to the outside, and a plurality of pairs of emission side auxiliary lenticular lenses for allowing a light which is incident to said incident side auxiliary lenticular lens to be emitted to the outside, the emission auxiliary lenticular lenses constituting each pair being arranged on both the sides of said emission side main lenticular lens, respectively; and said incident side main lenticular lenses and said emission side main lenticular lenses, and said incident side auxiliary lenticular lenses and said emission side auxiliary lenticular lenses are arranged in the same direction at positions such that said incident side main lenticular lenses and said emission side main lenticular lenses have one to one correspondence relationship and said incident side auxiliary lenticular lenses and said emission side auxiliary lenticular lenses have one to one correspondence relationship, respectively.

2. A transmission type projections screen as set forth in claim 1, wherein light absorption layers are provided at portions from which light is not emitted of said emission surface.

3. A transmission type projection screen as set forth in claim 1, wherein projected portions are provided at portions from which light is not emitted and light absorption layers are further provided on said projected portions.

4. A transmission type projection screen as set forth in claim 1, wherein optical diffusion material is filled into the screen.

5. A transmission type projection screen as set forth in claim 1, wherein said emission surface serves as an optical diffusion surface.

* * * * *